(12) United States Patent
Heckman et al.

(10) Patent No.: US 8,985,632 B1
(45) Date of Patent: Mar. 24, 2015

(54) SHEET METAL BEAD

(71) Applicant: Ford Global Technologies, LLC, Dearborn, MI (US)

(72) Inventors: William George Heckman, Plymouth, MI (US); Darrin Neil Wagner, Bloomfield Hills, MI (US); Sone Sadakhom, Ann Arbor, MI (US); Joshua Walters, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/096,622

(22) Filed: Dec. 4, 2013

(51) Int. Cl.
*B60R 22/24* (2006.01)
*B62D 25/04* (2006.01)

(52) U.S. Cl.
CPC ............... *B60R 22/24* (2013.01); *B62D 25/04* (2013.01)
USPC ..................................................... 280/801.2

(58) Field of Classification Search
CPC ................................ B60R 22/24; B60R 25/04
USPC ................... 280/801.2; 24/593.1, 572.1, 458; 296/193.06, 203.01, 146.6, 205, 146.1, 296/146.5, 187.12, 187.03, 202, 203.03
See application file for complete search history.

(56) References Cited

U.S. PATENT DOCUMENTS

| | | | |
|---|---|---|---|
| 4,165,944 A * | 8/1979 | Sunasky | 403/254 |
| 4,867,477 A * | 9/1989 | Escaravage | 280/801.2 |
| 6,250,681 B1 * | 6/2001 | Takahashi et al. | 280/805 |
| 6,607,239 B1 * | 8/2003 | Fuji | 296/203.03 |
| 7,841,650 B2 * | 11/2010 | Chen et al. | 296/193.06 |
| 7,959,217 B2 * | 6/2011 | Onuma | 296/187.12 |
| 8,366,183 B2 * | 2/2013 | Ishigame et al. | 296/193.06 |
| 8,662,457 B2 * | 3/2014 | Sampson | 248/74.4 |
| 2010/0219674 A1 | 9/2010 | Sakkinen et al. | |
| 2011/0101734 A1 * | 5/2011 | Gunther et al. | 296/193.06 |
| 2012/0319433 A1 | 12/2012 | Bufe et al. | |
| 2013/0146697 A1 * | 6/2013 | Kim et al. | 242/379 |
| 2013/0241239 A1 * | 9/2013 | Mori, Takeo | 296/193.06 |
| 2013/0269157 A1 * | 10/2013 | He et al. | 24/458 |

FOREIGN PATENT DOCUMENTS

EP 0 397721 B1 11/1994
WO WO 89/06330 7/1989

* cited by examiner

*Primary Examiner* — Drew Brown
(74) *Attorney, Agent, or Firm* — Jason Rogers; Bejin Bieneman PLC

(57) ABSTRACT

A bracket has an elongate portion of a predetermined length. The elongate portion terminates in a clamp end that includes a downward sloping portion connected to a curved contact portion. The curved contact portion is configured to contact a tunable bead of a sheet metal portion of a vehicle body structure such as a pillar. The sheet metal portion comprises a generally planar mating surface, an opening in the depression, and a bead rising from the mating surface, wherein the height of the bead is configured for a top surface of the bead to contact a bottom portion of a clamp when the clamp is in a secured position.

21 Claims, 5 Drawing Sheets

SHEET METAL BEAD

BACKGROUND

Many vehicles include seatbelts that may be height-adjusted at or near an attachment point of a seat belt shoulder harness. For example, the seatbelt may be attached to a sheet metal bracket attached to a B-pillar or the like (e.g., another pillar or structure in the vehicle) in an automobile or light truck. However, the sheet metal of the B-pillar to which an adjustable seatbelt clamp may be attached is configured differently in different vehicles. In particular, the bracket is configured for a specific material thickness of the sheet metal at a point of attachment, the material thickness being determined according to a design of the B-pillar balancing, at least, the required specifications for anticipated structural loads, safety requirements, and weight targets. Accordingly, at present, because sheet metal thickness generally varies from one vehicle to another, a bracket configured for one vehicle is not usable in other vehicles. This inability to use brackets of the same configuration in multiple vehicles increases costs and decreases deficiencies of vehicle manufacturing.

DRAWINGS

DETAILED DESCRIPTION

Figure 1:
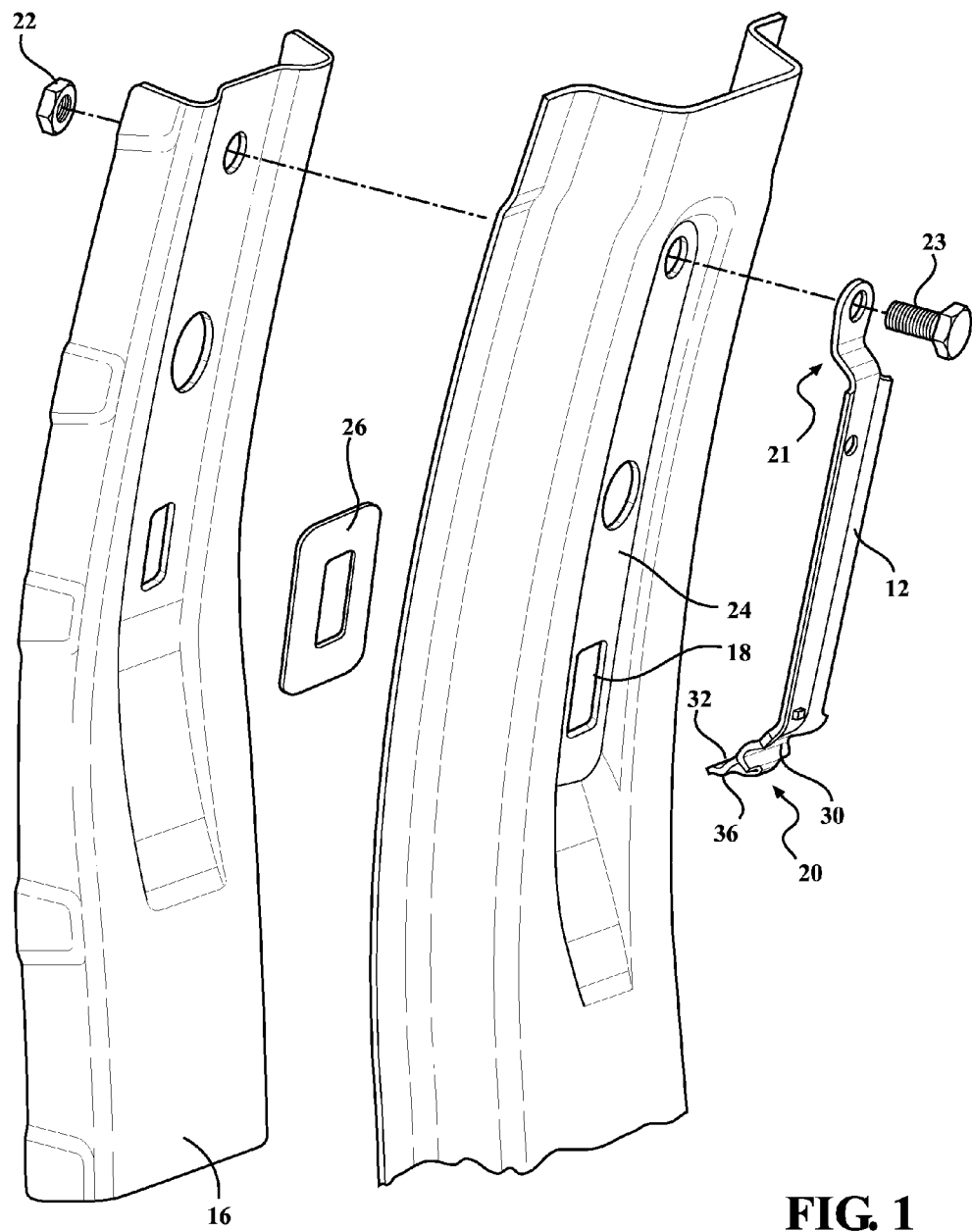
FIG. 1 is a perspective exploded view of an exemplary adjustable seat-belt clamp system.

FIG. 1 is a perspective exploded view of an exemplary adjustable seat-belt bracket system 10. An adjustable seatbelt bracket 10 may be attached the sheet metal 14 of a vehicle, e.g., a B-pillar of a passenger automobile or some other structure of the vehicle body, e.g., some other pillar, brace, wall, etc., that may be used to secure a seatbelt. The sheet metal 14 may be formed through a known production process, including through a stamping process. The sheet metal 14 is in turn attached to a sheet metal 16 of a vehicle body, whereby the vehicle B-Pillar comprises the sheet metal 14, 16. The bracket 10 is coupled to the sheet metal 14, 16, e.g., a vehicle B-pillar, by a clamp end 20 of the bracket and by a fastener or bolt 23 that may be secured to a nut 22 at a first end 21 of the clamp 12. A second or clamp end 20 of the bracket 10 may be inserted through an opening 18 in the sheet metal 14 and secured against a reinforcement 26 affixed to a back side of the sheet metal 14.

The reinforcement 26 is optional. In one exemplary arrangement where the sheet metal 14 is formed from an aluminum or aluminum alloy material, the reinforcement 26 has particular utility (although the sheet metal 14 could be formed from other materials). The reinforcement 26 may be formed from any appropriate material, such as aluminum or steel, to thereby securely accommodate the end of the bracket 10 and manage the forces and stresses transferred through the bracket and sheet metal 14 without unacceptable stress and/or damage to the aluminum sheet metal 14. Further details of the manner in which the clamp 12 may contact and be secured to the sheet metal 14 are discussed below, including the use of a bead 24 to accommodate the clamp 12.

Figure 2:
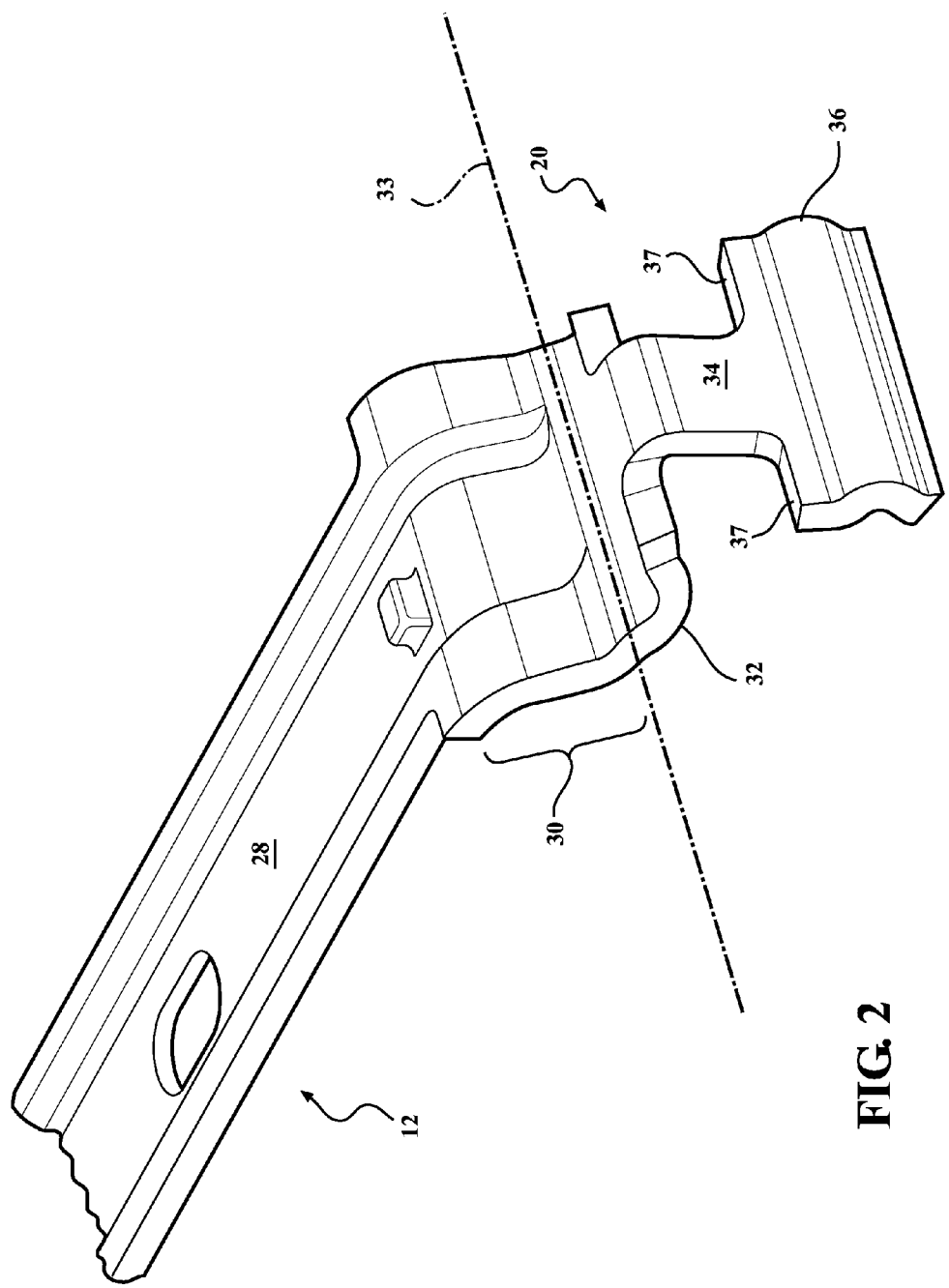
FIG. 2 is a perspective view of a portion of an exemplary adjustable seat-belt clamp.

FIG. 2 is a partial, perspective view of a portion of an exemplary adjustable seat-belt bracket 10. An elongate body 28 terminates at the end 20, which includes an inward or downward sloping portion 30, a curved contact portion 32, a descending arm 34, and a securing portion 36. The securing portion 36 may be generally T-shaped, and may include upper edges 37 that contact the reinforcement 26 when the clamp 12 is in a locked or secured position attached to the sheet metal 14. As described further below and illustrated in FIG. 5, the curved portion 32 contacts the bead 24 when the clamp 12 is in a properly installed and locked or secured position attached to the sheet metal 14.

Figure 3:
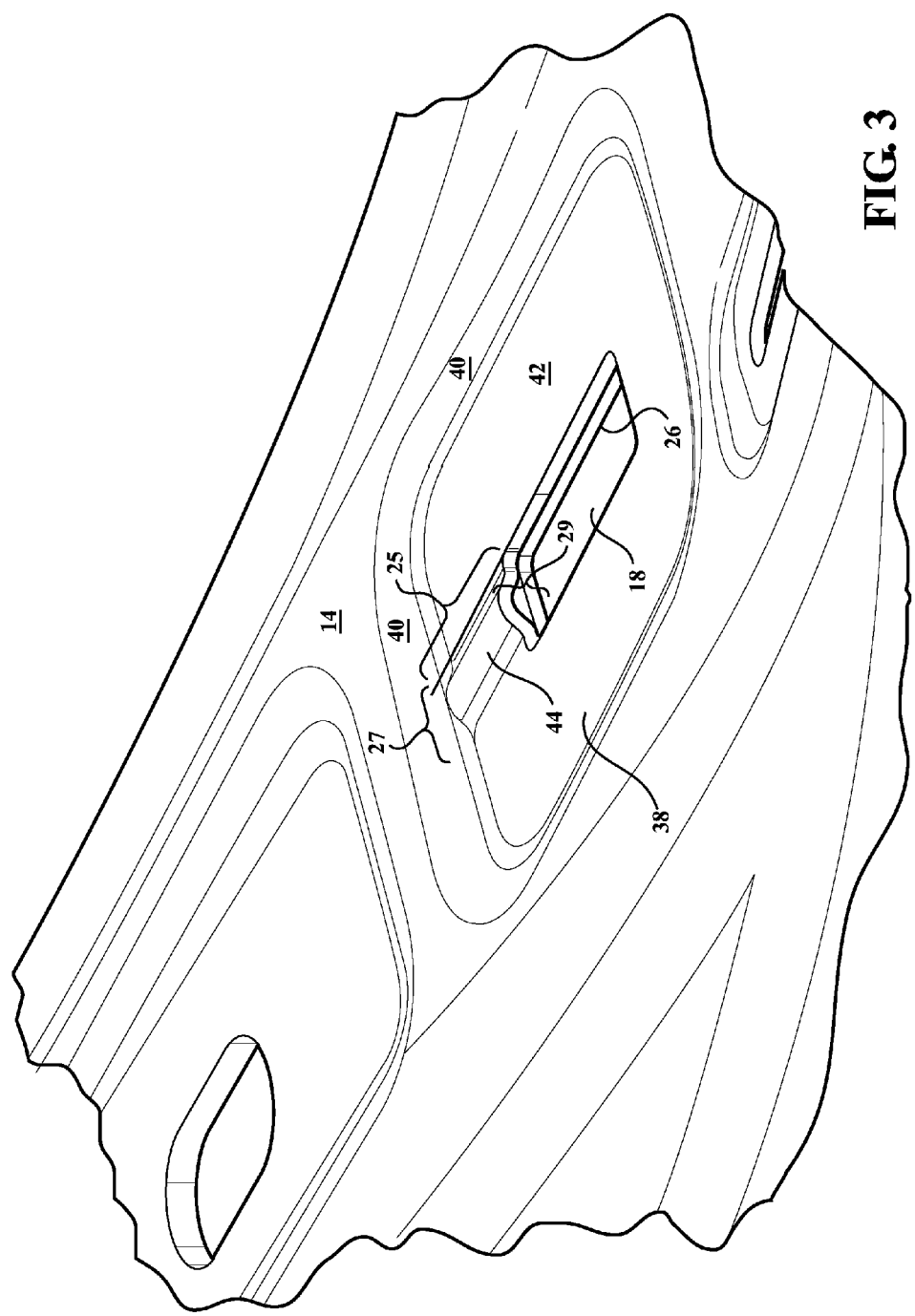
FIG. 3 is a perspective view of a front side of a portion an exemplary sheet metal.
Figure 5:
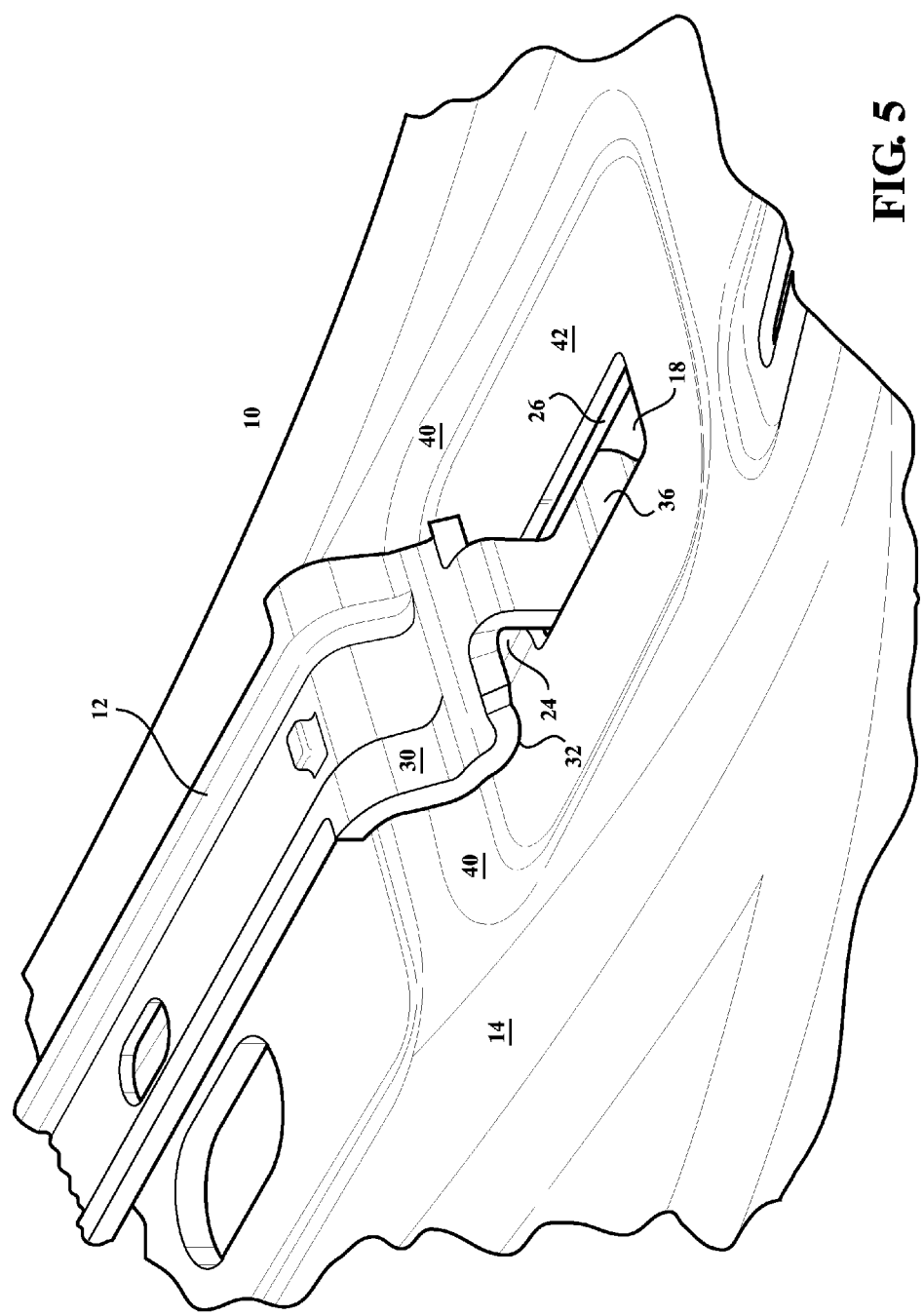
FIG. 5 is a top perspective view of a portion of the exemplary adjustable seat-belt clamp system of FIG. 1.

FIG. 3 is a perspective view of a front side of a portion an exemplary sheet metal 14. FIG. 5 is a top perspective view of a portion of the exemplary adjustable seat-belt bracket and system 10 of FIG. 1. As best illustrated in these Figures, the opening 18, which may be generally rectangular or some other shape as may be suitable (e.g., T-shaped) to accommodate the securing portion 36 of the clamp 12, is provided in a generally square or rectangular mating area 38 formed in a generally planar or slightly curving portion or section of the sheet metal 14.

The mating area 38 in the exemplary implementation shown in the present Figures forms a concavity or depression in the sheet metal 14, and includes generally sloped walls 40 that generally curve, e.g., are convex with respect to a front of the sheet metal 14. However, the walls 40 could be other than convex, e.g., concave, with respect to a front of the sheet metal 14, and moreover, the mating area 38 could be part of a plane of the sheet metal 14 or could form a convexity with respect to a front of the sheet metal 14. Whether the mating area 38 is convex, concave, or generally in a plane, with respect to the sheet metal 14 is not critical to the present disclosure, and is generally determined by manufacturing and/or design requirements. Accordingly, a mating surface 42 of the mating area 38 is generally planar, and may be generally in a plane, convex, or concave, with respect to the mating area 38 and/or the sheet metal 14, except that the bead 24 generally rises from the surface 42.

The bead 24 may be formed in the sheet metal 14, e.g., having a top surface 44. The top surface 44, as best seen in FIG. 3 may be generally rounded, although in some cases a flat top surface 44 may be preferable to better accommodate and support the stress of the clamp 12. The bead 24 is generally formed as part of a production process step of forming a vehicle body including a pillar such as a B-pillar, such as in a stamping process used to form elements of the sheet metal 14. Alternatively, the bead 24 may be post-formed on the bottom surface 42.

Further, the bead 24 generally includes a length 25 generally greater than a width 27 and such that the length 25 of the bead 24 is generally perpendicular to a cross axis 33 of the bracket 12 when the clamp 12 is secured to the sheet metal 14. The cross axis 33 may be defined by a line defined by points of the bottom-most portion of the curved contact portion 32 as best shown in FIG. 2. Further, the bead 24 may generally be convex toward the bracket 12 as it projects from the bottom surface 42, rising to a predetermined height 29, e.g., that is based upon the particular thicknesses of the components of the structure to which the bracket 12 is to be attached, e.g., a B-pillar, and the predetermined length of the clamp 12. As seen in FIG. 3, the height 29 of the bead 24 may be less than a height of the mating area 38 when the mating area forms a concavity with respect to a front of the sheet metal 14. However, as explained above, the mating area 38 may be planar or convex with respect to the front of the sheet metal 14, and it is to be noted that a height 29 of the bead 24 with respect to a height dimension of the mating area 38, or whether the mating area 38 even has a height dimension, is not critical.

Figure 4:
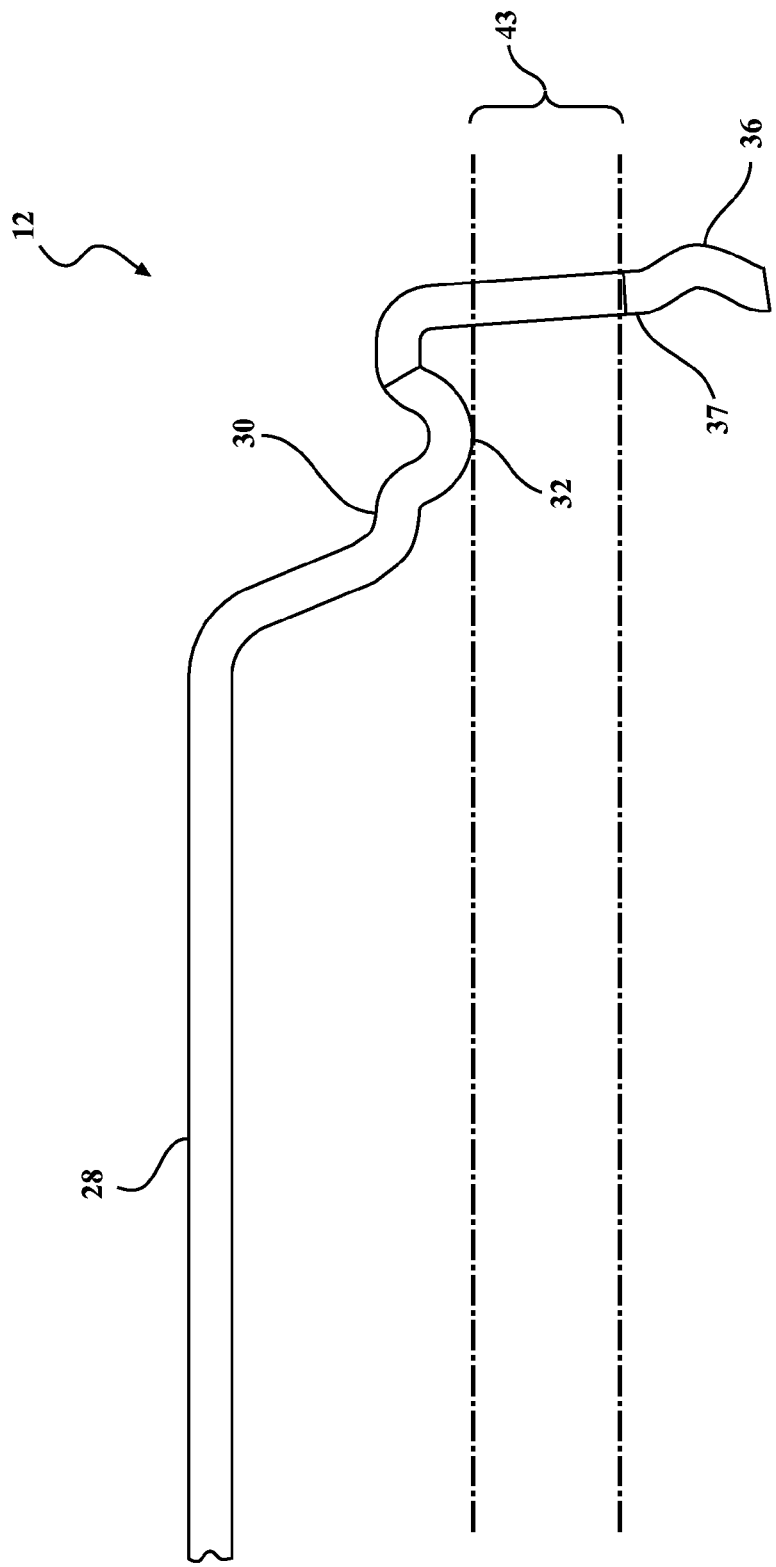
FIG. 4 is a cross-sectional view of an exemplary adjustable seat-belt clamp.

In general, the height 29 is configured to accommodate dimensions of the standardized bracket 12, whereby the bracket 12 may be used in a variety of vehicle configurations having a variety of thicknesses of sheet metal 14 and 16. In particular, the height 29 is predetermined to take into account a thickness of the sheet metal 14 in the area of the bead 24 and the bottom surface 42, along with dimensions of the bracket 12. For example, with reference to FIG. 4, which is a cross-sectional view of an exemplary adjustable seat-belt clamp 12, it may be seen that there is a distance 43 between a bottom-most point of the curved contact portion 32, and the top edges 37 of the securing portion 36.

Accordingly, the height 29 of the bead 24 may be determined and the bead 24 configured so that, taking into account a thickness of the sheet metal 14, a thickness of the reinforcement 26, and the distance 43, the clamp 12 may be secured to the sheet metal 14 and reinforcement 26, i.e., when in a securely clamped or locked the curved portion 32 contacts the top surface 44 of the bead 24, and the top edges 37 contact a surface of the reinforcement 26. For example, FIG. 5, a top perspective view of a portion of the exemplary adjustable seat-belt clamp system of FIG. 1, shows the clamp 12 in a secured position attached to the sheet metal 14.

Because the bead 24 may be designed, and in particular the height 43 of the bead 24 may be selected, to accommodate dimensions of the bracket 12 regardless of a thickness of sheet metal 14 and/or reinforcement 26 being used, the bead 24 is sometimes referred to as a "tunable," bead, i., the height 43 may be adjusted for a particular vehicle. Advantageously, the tunable bead 24 allows for a particular clamp 12 to be used in many different types of vehicles, e.g., even where the different types of vehicles attach the adjustable seat-belt bracket 12 to sheet metals 14 of structures, e.g., B-pillars, of different thicknesses. Accordingly, a manufacturer's costs may be greatly reduced by avoiding the need to design, purchase, etc., adjustable seat-belt brackets 12 of differing dimensions for each differing vehicle application. Using the standardized bracket 12 of the present disclosure further leads to more efficient and lower cost supply, inventory and manufacturing processes.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A sheet metal portion for a vehicle, comprising:
    a generally planar mating surface;
    an opening in the mating surface; and
    a bead rising from the mating surface, wherein the bead has a predetermined height configured for a top surface of the bead to contact a bottom portion of a standardized bracket that is convex with respect to the bead when the bracket is in a secured position; wherein the bracket includes a T-shaped securing portion including upper edges configured to contact a bottom surface of one of the sheet metal portion and a reinforcement affixed to the sheet metal portion.

2. The sheet metal portion of claim 1, wherein the sheet metal portion is included in a piece of sheet metal configured to be affixed to a vehicle body structure.

3. The sheet metal portion of claim 2, wherein the vehicle body structure is a vehicle pillar.

4. The sheet metal portion of claim 1, wherein the bracket includes an adjustable seat-belt clamp.

5. The sheet metal portion of claim 1, wherein an axis defined by a line defined by points of a bottom-most portion of a curved contact portion is generally perpendicular to a length of the bead when the clamp is in the secured position.

6. The sheet metal portion of claim 1, wherein the top surface of the bead is one of generally rounded and generally flat.

7. A bracket system for a vehicle, comprising:
    a clamp that includes an elongate portion terminating in an end that includes a downward sloping portion connected to a curved contact portion; and
    a sheet metal portion that includes a generally planar mating surface, an opening in the bottom surface of a depression; and a bead rising from the mating surface, wherein the height of the bead is configured for a top surface of the bead to contact a bottom of the curved contact portion when the clamp is in a secured position.

8. The system of claim 7, wherein the sheet metal portion is included in a piece of sheet metal configured to be affixed to a vehicle body structure.

9. The system of claim 7, wherein the clamp is an adjustable seat-belt clamp.

10. The system of claim 7, wherein the clamp includes a T-shaped securing portion including upper edges configured to contact a bottom surface of one of the sheet metal portion and a reinforcement affixed to the sheet metal portion.

11. The system of claim 10, wherein the height of the bead is determined according to a distance between the bottom of the curved contact portion and the upper edges.

12. The system of claim 7, wherein an axis defined by a line defined by points of a bottom-most portion of a curved contact portion is generally perpendicular to a length of the bead when the clamp is in the secured position.

13. The system of claim 7, wherein the top surface of the bead is one of generally rounded and generally flat.

14. A seatbelt bracket for installation on a vehicle and for providing an adjustable shoulder anchor for a safety restraint belt, the bracket comprising:
    a clamp having an elongate portion of a predetermined length,
    the elongate portion terminating in a clamp end that includes a downward sloping portion connected to a curved contact portion, the curved contact portion configured to contact a tunable bead of a sheet metal portion of the vehicle, the sheet metal including a generally planar mating surface, an opening in the mating surface, and a bead rising from the mating surface, wherein a height of the bead is configured for a top surface of the bead to contact a bottom of the curved contact portion when the clamp is in a secured position.

15. The bracket of claim 14, wherein the curved contact portion includes a generally T-shaped securing portion including upper edges configured to contact a bottom surface of one of the sheet metal portion and a reinforcement affixed to the sheet metal portion.

16. The bracket of claim 14, wherein the height of the bead is determined according to a distance between the bottom of the curved contact portion and the upper edges.

17. The bracket of claim 16, wherein an axis defined by a line defined by points of a bottom-most portion of a curved contact portion is generally perpendicular to a length of the bead when the clamp is in the secured position.

18. The bracket of claim 14, wherein the top surface of the bead is one of generally rounded and generally flat.

19. A sheet metal portion for a vehicle, comprising:
a generally planar mating surface;
an opening in the mating surface; and
a bead rising from the mating surface, wherein the bead has a predetermined height configured for a top surface of the bead to contact a bottom portion of a standardized bracket when the bracket is in a secured position, wherein the bracket includes an adjustable seat-belt clamp.

20. A sheet metal portion for a vehicle, comprising:
a generally planar mating surface;
an opening in the mating surface; and
a bead rising from the mating surface, wherein the bead has a predetermined height configured for a top surface of the bead to contact a bottom portion of a standardized bracket when the bracket is in a secured position, wherein an axis defined by a line defined by points of a bottom-most portion of a curved contact portion is generally perpendicular to a length of the bead when the clamp is in the secured position.

21. The sheet metal portion of claim 20, wherein the opening is one of generally T-shaped and generally rectangular.

* * * * *